US009116977B2

(12) United States Patent
Han et al.

(10) Patent No.: US 9,116,977 B2
(45) Date of Patent: Aug. 25, 2015

(54) SEARCHING INFORMATION (71) Applicant: Alibaba Group Holding Limited, Grand Cayman (KY)

(72) Inventors: Xiaomei Han, Hangzhou (CN); Chao Song, Hangzhou (CN); Song Yang, Hangzhou (CN); Chao Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 171 days.

(21) Appl. No.: 13/645,267

(22) Filed: Oct. 4, 2012

(65) Prior Publication Data
US 2013/0091165 A1    Apr. 11, 2013

(30) Foreign Application Priority Data

Oct. 10, 2011    (CN) .......................... 2011 1 0305264

(51) Int. Cl.
*G06F 17/30*    (2006.01)
(52) U.S. Cl.
CPC .... *G06F 17/30693* (2013.01); *G06F 17/30536* (2013.01); *G06F 17/30864* (2013.01)
(58) Field of Classification Search
None
See application file for complete search history.

(56) References Cited

U.S. PATENT DOCUMENTS

| | | |
|---|---|---|
| 2005/0240576 A1 | 10/2005 | Piscitello et al. |
| 2006/0122979 A1 | 6/2006 | Kapur et al. |
| 2007/0061303 A1 | 3/2007 | Ramer et al. |
| 2008/0005072 A1 | 1/2008 | Meek et al. |
| 2008/0313147 A1* | 12/2008 | Svore et al. ....................... 707/3 |
| 2010/0036832 A1 | 2/2010 | Griffith et al. |
| 2010/0169343 A1* | 7/2010 | Kenedy et al. ................ 707/758 |
| 2010/0179948 A1* | 7/2010 | Xie et al. ....................... 707/706 |
| 2011/0131160 A1* | 6/2011 | Canny et al. .................... 706/12 |
| 2011/0302031 A1 | 12/2011 | Chen et al. |
| 2011/0320443 A1 | 12/2011 | Ray et al. |
| 2012/0005021 A1 | 1/2012 | Ratnam |
| 2012/0117043 A1* | 5/2012 | Radlinski et al. ............. 707/706 |
| 2012/0166277 A1 | 6/2012 | Gnanamani et al. |
| 2012/0191745 A1* | 7/2012 | Velipasaoglu et al. ........ 707/767 |
| 2012/0221557 A1 | 8/2012 | Edmonds et al. |

FOREIGN PATENT DOCUMENTS

| | | |
|---|---|---|
| WO | WO2006057544 | 6/2006 |
| WO | WO2007001128 | 1/2007 |

OTHER PUBLICATIONS

The PCT Search Report mailed Jan. 9, 2012 for PCT application No. PCT/US12/58727, 13 pages.
Translation of Chinese office action from corresponding Chinese patent application No. 201110305264.4, dated Apr. 3, 2015, 2 pages.

* cited by examiner

*Primary Examiner* — Jay Morrison
(74) *Attorney, Agent, or Firm* — Lee & Hayes, PLLC (57) ABSTRACT

The present disclosure provides a method and an apparatus of searching information. In one example embodiment, the present techniques obtain a category click rate of a query and a category click rate of published information, calculate a similarity degree between the query and the published information based on the category click rate of the query and the category click rate of the published information, and return the published information as a successful matching result if the calculated similarity degree is higher than a first threshold. The present techniques may ensure the accuracy rate and improve the return rate to provide more return results to a user.

17 Claims, 6 Drawing Sheets

SEARCHING INFORMATION

CROSS REFERENCE TO RELATED PATENT APPLICATIONS

This application claims foreign priority to Chinese Patent Application No. 201110305264.4 filed on 10 Oct. 2011, entitled "Method and Apparatus of Searching Information," which is hereby incorporated by reference in its entirety.

TECHNICAL FIELD

The present disclosure relates to the field of network searching technology and, more specifically, to a method and an apparatus of searching information.

BACKGROUND

With the development of the Internet, more and more merchants have used e-commerce websites for business. Generally, a seller publishes product information at an e-commerce website through a client terminal. When a buyer searches desired published information at the e-commerce website, the buyer inputs a query at an interface provided by a back-end server of the e-commerce website. The query includes one or more core words or keywords. The back-end server matches the query with previously stored published information. If there is a match, the corresponding published information is returned.

Specifically, under the conventional techniques, the back-end server may use the following steps to match the query with the previously stored published information.

At a first step, the one or more keywords in the query are extended to obtain one or more queries related to the one or more keywords, such as multiple synonyms and homonyms.

At a second step, each of the keywords, the synonyms, and the homonyms is matched with the previously stored published information. If there is published information including at least one of the keywords, the synonyms, and the homonyms, such published information is returned as a successful matching result.

The conventional searching techniques have some disadvantages as listed below.

First, the return rate is low. When the query is extended, due to the restriction of accuracy and performance, the number of extended queries is limited. Thus, the matched published information will also be limited. There are few successful matching results and the return rate is low.

Second, the conventional searching techniques completely rely on characteristics of the query. When the query is extended, the extension is totally based on the characteristics of the query without considering characteristics of the published information (or documents). Thus, the number of extended queries is few and the accuracy of the extension is hardly guaranteed.

Third, the extension of query needs considering not only a relatedness between the original query and the extend queries but also a relatedness between the original query and the documents, and a relatedness between the extended queries and the documents. This makes the calculation too complicated and the calculation efficiency too low, and reduces the searching speed. There are also multiple calculation steps in the relatedness calculation. If the accuracy rate at any of the steps is low, the calculation result of the final relatedness will be inaccurate.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method of searching information. The present techniques obtain a category click rate of a query and a category click rate of published information, and calculate a similarity degree between the category click rate of the query and the category click rate of the published information. When the calculated similarity degree is above a first threshold, the published information is used as a successful matching result to be returned.

For example, the present techniques may obtain the category click rate of the query as follows. The present techniques segment the query to obtain one or more words and obtain the category click rate of the words after the segment from historical statistics information of category click rates. The category click rate of the words after the segment is a category click rate of a string formed by the words after the segment for a corresponding category. The present techniques perform the following operations to the words after the segments in turn. A word in the words after the segment, which is undergoing the operations, is called a present word. If a difference between a category click rate of a string formed by words after the segment except for the present word and a category link rate of another string formed by the words after the segment reaches a second threshold, the present word is determined as a core word. Otherwise, the present word is determined as a non-core word. The present techniques obtain a category click rate of a string formed by all core words for the corresponding category as the category click rate of the query.

For example, the present techniques may perform the following operations to obtain a category click rate of published information. The published information is segmented to obtain one or more core words. A category click rate of a string formed by core words after the segment for the corresponding category is obtained from historical statistics information of category click rates.

For example, the present techniques may calculate the similarity degree between the category click rate of the query and the category click rate of the published information as follows. The present techniques calculate a distance between the category click distribution of the query and the category click distribution of the published information based on the category click rate of the query and the category click rate of the published information. The present techniques then calculate the similarity degree between the query and the published information based on an interval where the distance locates.

For instance, the present techniques may calculate the distance between the category click distribution of the query and the category click distribution of the published information based on the category click rate of the query and the category click rate of the published information by using a formula below:

$$D(Q_p, D_p) = \sum_w p_Q(w) \cdot \log \frac{p_Q(w)}{p_D(w)}$$

$Q_p$ represents the category click distribution of the query. $D_p$ represents the category click distribution of the published information. $D(Q_p,D_p)$ represents the distance between the category click distribution of the query and the category click distribution of the published information. $p_Q(w)$ represents a category click rate of a string composed of core words in the query at a w th category. $p_D(w)$ represents a category click rate of a string composed of core words in the published information at the w th category. w represents a serial number of a category in the categories, w=1, 2, . . . M, where M is a number of all categories in the historical statistics information of the category click rates.

For example, the present techniques may return successful matching results as follows. The present techniques rank one or more successful matching results based on a descending order of their similarity degrees and return them as the return results.

The present disclosure also provides an apparatus of providing searching information. The apparatus may include an obtaining unit, a calculation unit, and a transmission unit. The obtaining unit obtains a category click rate of a query and a category click rate of published information. The calculation unit calculates a similarity degree between the category click rate of the query and the category click rate of the published information. The transmission unit, when the calculated similarity degree is above a first threshold, transmits the published information as a return result of successful matching to be returned.

For example, the obtaining unit may include a first segmenting module, a first obtaining module, a revising module, and a second obtaining module. The first segmenting module segments the query to obtain one or more words. The first obtaining module obtains the category click rate of the words after the segment from historical statistics information of category click rates. The category click rate of the words after the segment is a category click rate of a string formed by the words after the segment for a corresponding category. The revising module performs following operations to the words after the segment in turn. A word that is undergoing the following operations is called a present word. If a difference between a category click rate of a string formed by the words after the segment except for the present word and a category link rate of another string formed by the words after the segment reaches a second threshold, the present word is determined as a core word. Otherwise, the present word is determined as a non-core word. The second obtaining module obtains a category click rate of a string formed by all core words for the corresponding category as the category click rate of the query.

In another example, the obtaining unit may also include a second segmenting module and a third obtaining module. The second segmenting module segments the published information to obtain one or more core words. The third obtaining module obtains a category click rate of a string formed by all of such core words in the published information after the segment for the corresponding category from historical statistics information of category click rates.

The calculation unit may include a first calculation module and a second calculation module. The first calculation module calculates a distance between a category click distribution of the query and a category click distribution of the published information based on the category click rate of the query and the category click rate of the published information. The second calculation module calculates a similarity degree between the query and the published information based on an interval where the distance locates.

The first calculation module may, for example, calculate the distance between the category click distribution of the query and the category click distribution of the published information based on the category click rate of the query and the category click rate of the published information by using a following equation:

$$D(Q_p, D_p) = \sum_w p_Q(w) \cdot \log \frac{p_Q(w)}{p_D(w)}$$

$Q_p$ represents the category click distribution of the query. $D_p$ represents the category click distribution of the published information. $D(Q_p,D_p)$ represents distance between the category click distribution of the query and the category click distribution of the published information. $p_Q(w)$ represents a category click rate of a string composed of core words in the query at a w th category. $p_D(w)$ represents a category click rate of a string composed of core words in the published information at the wth category. w represents a serial number of a category in the categories, w=1, 2, . . . M, where M is a number of all categories in the historical statistics information of the category click rates.

The present techniques use the category click rate of the query and the category click rate of the published information to calculate the similarity degree between the two. Thus, the present techniques consider the characteristics of the query and the published information (or documents) when determining the successfully matching search results, thereby ensuring the accuracy rate of the search results. In addition, the present techniques determine the return results based on the similarity degree instead of returning the published information only when the published information completely includes the query, thereby improving the returning rate while ensuring the accuracy rate of the search results, i.e., providing more results to the user. Further, the conventional techniques, when extending the query, need to calculate multiple correlations (such as the relatedness between the original query and the extend query, the relatedness between the original query and the documents, and the relatedness between the extended query and the documents). The present techniques calculate the similarity degree between the query and the published information, thereby reducing the calculation complexity and increasing the calculation speed.

The present techniques may also pre-process the query and the published information prior to calculating the similarity degree. For example, the present techniques may remove unnecessary core words from the query and extract necessary core words from the published information. The present techniques may calculate the similarity degree based on the necessary core words and avoid calculation of the unnecessary core words, thereby improving a speed to return the search results.

Certainly, it is not necessary that any product under the present techniques should achieve all above advantages at the same time.

BRIEF DESCRIPTION OF THE DRAWINGS

To better illustrate embodiments of the present disclosure, the following is a brief introduction of figures to be used in descriptions of the embodiments. It is apparent that the following figures only relate to some embodiments of the present disclosure. A person of ordinary skill in the art can obtain other figures according to the figures in the present disclosure without creative efforts.

DETAILED DESCRIPTION

The following is detailed descriptions of the present techniques by reference to the FIGs. The described embodiments herein are example embodiments and should not be used to restrict the scope of the present disclosure.

Figure 1:
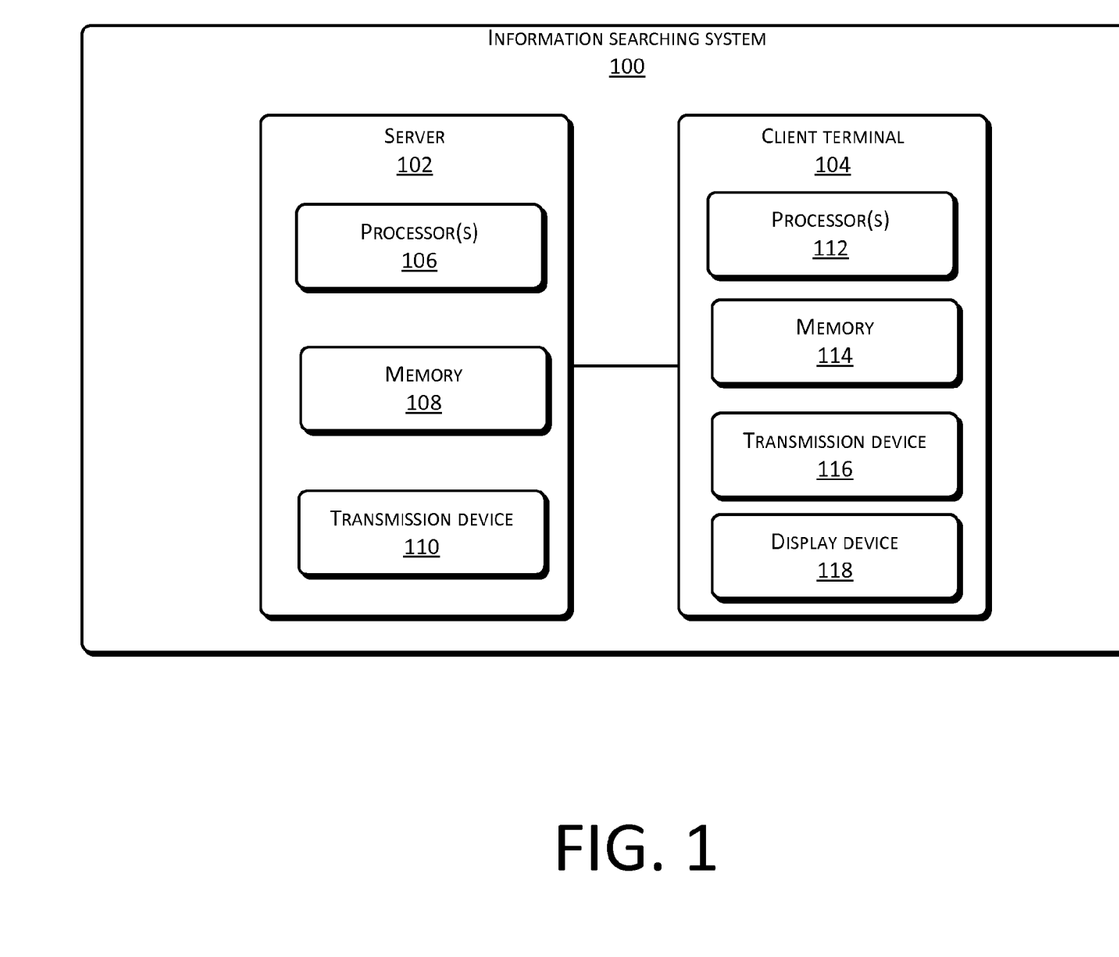
FIG. 1 illustrates a diagram of an example computing system architecture in accordance with an example embodiment of the present disclosure.

Prior to describing details of the example embodiments, FIG. 1 illustrates an example appropriate computing system that implements principles of the present techniques. In the following descriptions, unless stated otherwise, the example embodiments are described by reference to one or more reference numbers of actions and operations in the FIGs performed by one or more computers. The actions and operations performed by the computers may include operations performed by one or more processors in the computers to data in a form of computer-executable instructions. Such operations modify or maintain the data at one or more computer storage media in a manner understood by one of ordinary skill in the industry. In addition, one of ordinary skill in the industry would understand that the actions and operations described in the example embodiments may also be performed by hardware. The example embodiments in the present disclosure are for illustration purpose, and shall not be used to restrict the scope of the present disclosure.

In the FIGs, the same reference numbers refer to the same element. The example embodiments are illustrated in the example appropriate computing system. The example embodiments herein, however, are not exhaustive and shall not be construed to limit the present disclosure, for example, to cover all alternative embodiments.

FIG. 1 illustrates a diagram of an example computing system architecture in accordance with an example embodiment of the present disclosure. The example computing system architecture is for illustration purpose and is only an example of the appropriate environment, and does not intend to limit the scope and functionalities of the present techniques. The computing system shall not be construed to rely on any specific component or combination of components as shown in FIG. 1.

The present techniques may also be implemented in any other general purpose or special computing or communicating environment or configuration. The applicable computing system, environment, and configuration may include, but are not limited to, personal computer, serve, multi-processor system, microprocessor based system, minicomputer, mainframe, and a distribution computing system including any one or more of the above system or device.

In an example configuration, an information searching system 100 in FIG. 1 may include at least a server 102 of a website and a client terminal 104. The server 102 may include, but is not limited to, one or more processors 106, memory 108, and transmission device 110. The one or more processors 106 may be any processing devices such as the micro-processing units or the field-programmable gate array (FPGA).

The memory 108 may include computer storage media in the form of volatile memory, such as random-access memory (RAM) and/or non-volatile memory, such as read only memory (ROM) or flash RAM. The memory 108 is an example of computer storage media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include transitory media such as modulated data signals and carrier waves. The memory 108 may store therein program units or modules and program data. The transmission device 110 communicates with the client terminal.

The client terminal 104 may include, but is not limited to, one or more processors 112 such as the micro-processing units, memory 114 in the form of computer storage media, a transmission device 116 that communicates with the server 102, and a display device 118 that interacts with a user.

In the example of FIG. 1, the information searching system 100 may be any hardware or a combination of hardware that is capable to perform any software, firmware, or computer-executable instructions to implement functionalities. The information searching system 100 may be a distributive system to implement distributive functionalities.

In the present disclosure, the modules, units, or components may be any computer-executable instructions or instances configured to be performed by one or more processors at the information searching system 100. The described different components, modules, units, search engines, or services may be any objects or threads implemented by the information searching system 100, such as in a form of a separate instance. Alternatively, the components, modules, units, search engines, or services may be implemented in a form of hardware such as a computing device or a combination of hardware and software.

The present disclosure provides a first example embodiment as below. In the example of FIG. 1, the information searching system 100 includes the server 102 and the client terminal 104. The client terminal 104 sends the query of the user to the server 102. The server 102 obtains the category click rate of the query and the category click rate of the published information, calculates a similarity degree between query and the published information based on the category click rate of the query and the category click rate of the published information, and returns the published information as the successful matching result if the calculated similarity degree is higher than a first threshold.

In the example embodiments of the present disclosure, the published information may include, but is not limited to, any product information published by any other user through one or more servers such as the server 102. The published information may be stored in the servers. The published information may also include any other information, such as news information, social network information, etc. The category click rate of the query is the category click rate of the query at various categories calculated by the server 102 based on statistics of historical click information. The category click rate of the published information is the category click rate of the published information at various categories calculated by the server 102 based on statistics of historical click information.

For example, the category may be different classifications set by needs. For instance, the category may include electronics, clothes, cosmetics, food, etc. When the user uses the query as a searching condition to send a searching request to a search engine, the search engine searches the published information related to the query in one or more categories to which the query belongs, and returns the published information to the user. If the user clicks one of the returned published information, the category to which the published information belongs is clicked. A number of clicks of all categories to which the query belongs is calculated. A percentage of a number of clicks of a respective category to a number of all the categories is also calculated. The percentage may be used as the category click rate of the query for the respective category.

Based on the same principles, when the user uses the core word in the published information as a searching condition to send a searching request to a search engine, the search engine searches the published information related to the core word in the categories to which the core word belongs, and returns the published information to the user. If the user clicks one of the returned published information, the category to which the published information belongs is clicked. A number of clicks of all categories to which the core word belongs is calculated. A percentage of a number of clicks of a respective category to a number of clicks of all categories is also calculated. The percentage may be used as the category click rate of the published information for the respective category.

For example, when the search word is "apple," the search engine may determine that the query corresponds to two categories, i.e. "electronics" and "food." The search engine obtains a number of user clicks of published information related to "apple" under the "electronics" category and the "food" category respectively based on statistics of historical click information. Assuming that the published information related to "apple" under the "electronics" category is clicked 10,000 times by the users and the published information related to "apple" under the "food" category is clicked 5,000 times by the users, the category click rate of query "apple" for the "electronics" category is ⅔ and the category click rate of query "apple" for the "food" category is ⅓.

When the query or the published information contains multiple core words, the categories may be determined by a string composed of the multiple core words.

In this example embodiment, the category click rate of the query and the category click rate of the published information are used to calculate the similarity degree between the two, thereby ensuring a successful matching while considering the characteristics of both the query and the published information (or documents) to ensure the accuracy rate of the return results. In addition, this example embodiment returns the matching results based on the similarity degree instead of returning the published information only when the published information completely includes the query, thereby ensuring the accuracy rate of the return results while improving the returning rate, i.e., providing more results to the users.

Figure 2:
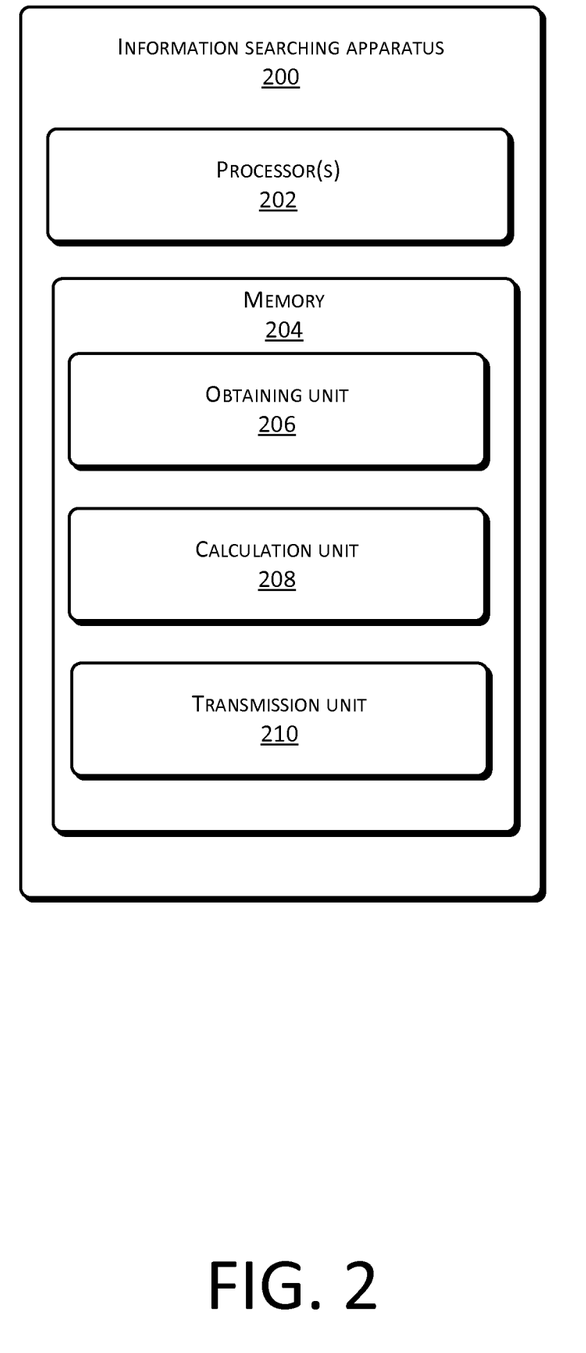
FIG. 2 illustrates a diagram of an example information searching apparatus.

FIG. 2 illustrates a diagram of an example information searching apparatus 200. The information searching apparatus 200 may reside at the server 102. Alternatively, the information searching apparatus 200 may be a computing device separate to the server 102.

In the example of FIG. 2, the information searching apparatus 200 may include, but is not limited to, one or more processors 202 and memory 204. The memory 204 may be computer storage media and store therein program units or modules and program data. The units of the information searching apparatus 200 stored on the memory 204 may include an obtaining unit 206, a calculation unit 208, and a transmission unit 210.

The obtaining unit 206 obtains the category click rate of the query and the category click rate of the published information. The calculation unit 208 calculates a similarity degree between the query and the published information based on the category click rate of the query and the category click rate of the published information. The transmission unit 210 returns the published information as the successful matching result if the calculated similarity degree is higher than a first threshold. The first threshold may be a preset number or set based on actual needs.

The category click rate of the query and the category click rate of the published information are used to calculate the similarity degree between the two, thereby ensuring a successful matching while considering the characteristics of both the query and the published information (or documents) to ensure the accuracy rate of the return results. In addition, the present techniques return the search results based on the similarity degree instead of requiring the published information to completely include the query, thereby ensuring the accuracy rate of the return result and increasing the returning rate, i.e., providing more return results to the user.

Figure 3:
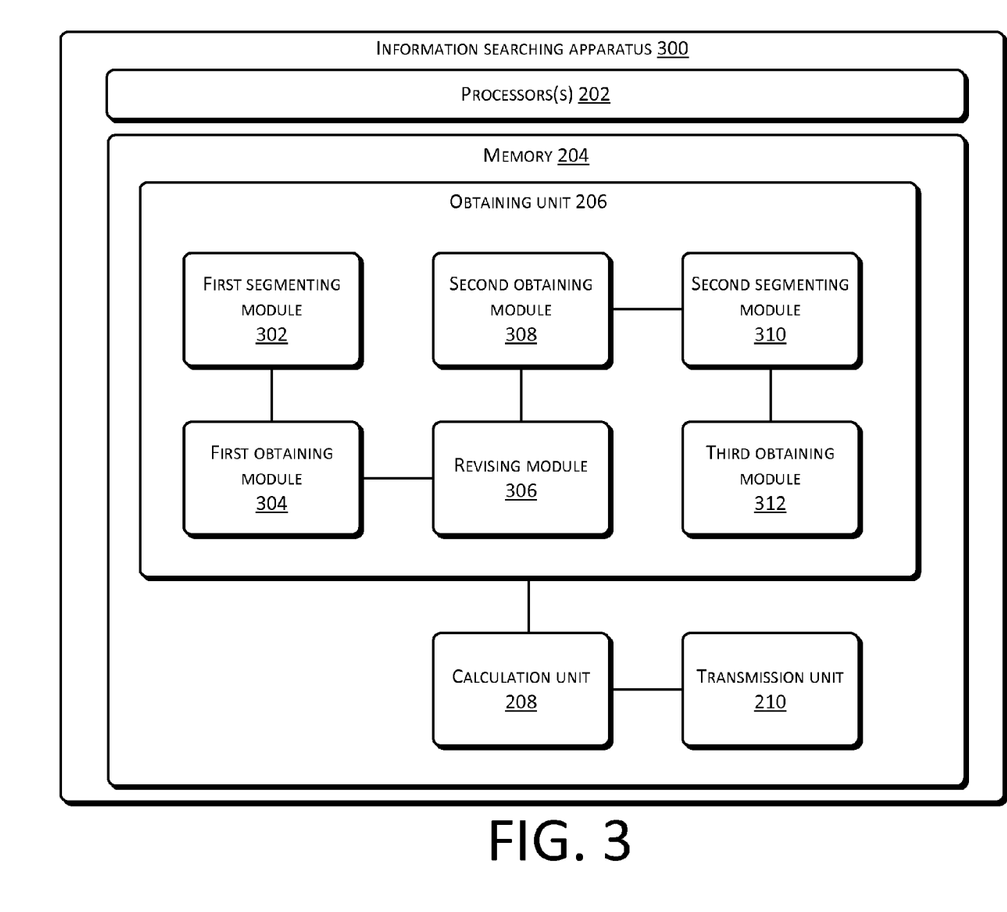
FIG. 3 illustrates a diagram of another example information searching apparatus.

To reduce the processing time to return results, in some examples, the present techniques may modify the obtaining unit 206 to pre-process the query before obtaining the category click rate of the query. FIG. 3 illustrates a diagram of another example information searching apparatus 300. In the example of FIG. 3, the obtaining unit 206 may include a first segmenting module 302, a first obtaining module 304, a revising module 306, and a second obtaining module 308. The first segmenting module 302 segments the query to obtain one or more words. The first obtaining module 304 obtains the category click rate of the words after the segment based on historical statistics information of category click rates. The category click rate of the words after the segment is a category click rate of a string formed by the words after the segment for a corresponding category. The revising module 306 performs the following operations to the words after the segment in turn. A word that is undergoing the following operations is called a present word. If a difference between a category click rate of a string formed by the words after the segment except for the present word and a category click rate of another string formed by the words after the segment reaches a second threshold, the present word is determined as a core word. Otherwise, the present word is determined as a non-core word. The second obtaining module 308 obtains a category click rate of a string formed by all core words for the corresponding category as the category click rate of the query. In one example, the query is pre-processed prior to calculation of the similarity degree. That is, unnecessary core words are removed from the query, and only necessary core words are used for calculation of similarity degree. Thus, the calculation of the unnecessary core words is avoided and the speed of increasing return results is improved. For example, the corresponding categories may refer to all categories in the historical statistics information.

For example, the pre-processing of the query may include following operations. First, the query is segmented to obtain multiple to-be-processed words. Optionally, some stop words may be filtered out and the remaining words are used as the to-be-processed words, which may be conducted through a word table. In one example, the stop words may include descriptive words. The category click rate of the short string composed of all to-be-processed words in the query (for example, the to-be-processed words may include word A, word B, and word C) for the corresponding category may be Q. After word A is removed, the category click rate of the short string composed of the remaining words (for example, word B and word C) of the query for the corresponding category may be QA. Q and QA are compared. If the difference between the two is large (such that it is larger than the preset second threshold which may be set based on actual needs), it means that word A provides large volume of information to the original string Q and A is determined as the core word. Otherwise, word A is determined as the non-core word and can be discarded. Each word in the query is determined as core words or non-core words and the non-core words are removed. Finally, the category click rate of a string composed of all core words for the corresponding category is obtained, and used as the category click rate of the query.

To reduce the processing time of returning the search results, in another example, the present techniques make improvements to the obtaining unit 206 to pre-process the published information prior to obtaining the category click rate of the published information. For example, as shown in FIG. 3, the obtaining unit 206 may further include a second segmenting module 310 and a third obtaining module 312. The second segmenting module 310 segments the published information to obtain one or more core words. The third obtaining module 312 obtains the category click rate of the string formed by all core words after the segment for the corresponding category from historical statistics information of category click rates. In this example, the published information is pre-processed prior to the calculation of the similarity degree, i.e., necessary core words are extracted from the published information. Thus, only necessary core words are used for calculation of similarity degree. The calculation of the unnecessary core words is avoided and the speed of increasing return results is improved.

Figure 4:
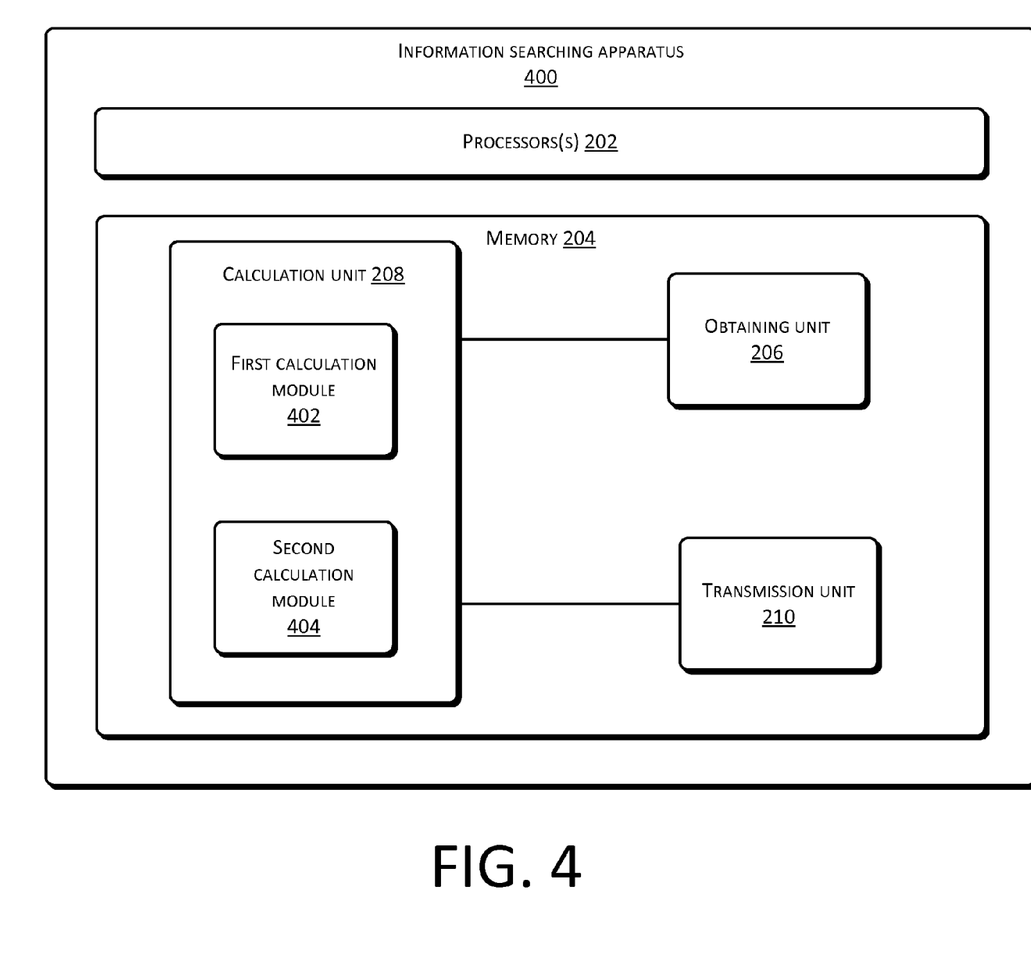
FIG. 4 illustrates a diagram of another example information searching apparatus.

FIG. 4 illustrates a diagram of another example information searching apparatus 400. In the example of FIG. 4, the calculation unit 208 may include a first calculation module 402 and a second calculation module 404. The first calculation module 402 calculates a distance between the category click distribution of the query and the category click distribution of the published information based on the category click rate of the query and the category click rate of the published information. The second calculation module 404 calculates a similarity degree between the query and the published information based on an interval where the distance locates. In this example, the present techniques determine the return results based on the similarity degree instead of returning the published information only when the published information completely includes the query, thereby improving the returning rate when ensuring the accuracy rate of the search results, i.e., providing more return results to the user.

In one example, the present techniques may use the KL distance calculation formula to calculate the distance between the category click distribution of the query and the category click distribution of the published information. In some other examples, the present techniques may use some other methods based on system requirements. For instance, the first calculation module 402 may use the following formula to calculate the distance between the category click distribution of the query and the category click distribution of the published information based on the category click rate of the query and the category click rate of the published information.

$$D(Q_p, D_p) = \sum_w p_Q(w) \cdot \log \frac{p_Q(w)}{p_D(w)}$$

$Q_p$ represents the category click distribution of the query. $D_p$ represents the category click distribution of the published information. $D(Q_p, D_p)$ represents the distance between the category click distribution of the query and the category click distribution of the published information. $p_Q(w)$ represents a category click rate of a string composed of core words in the query at a w th category. $p_D(w)$ represents a category click rate of a string composed of core words in the published information at the w th category. w represents a serial number of a category in the categories, w=1, 2, . . . M, where M is a number of all categories in the historical statistics information of the category click rates.

In one example, the transmission unit 210 returns the published information as the successful matching results. The returned multiple successful matching results may be ranked based on their similarity degrees from high to low. Thus, the user may quickly locate his/her desired matching results.

Figure 5:
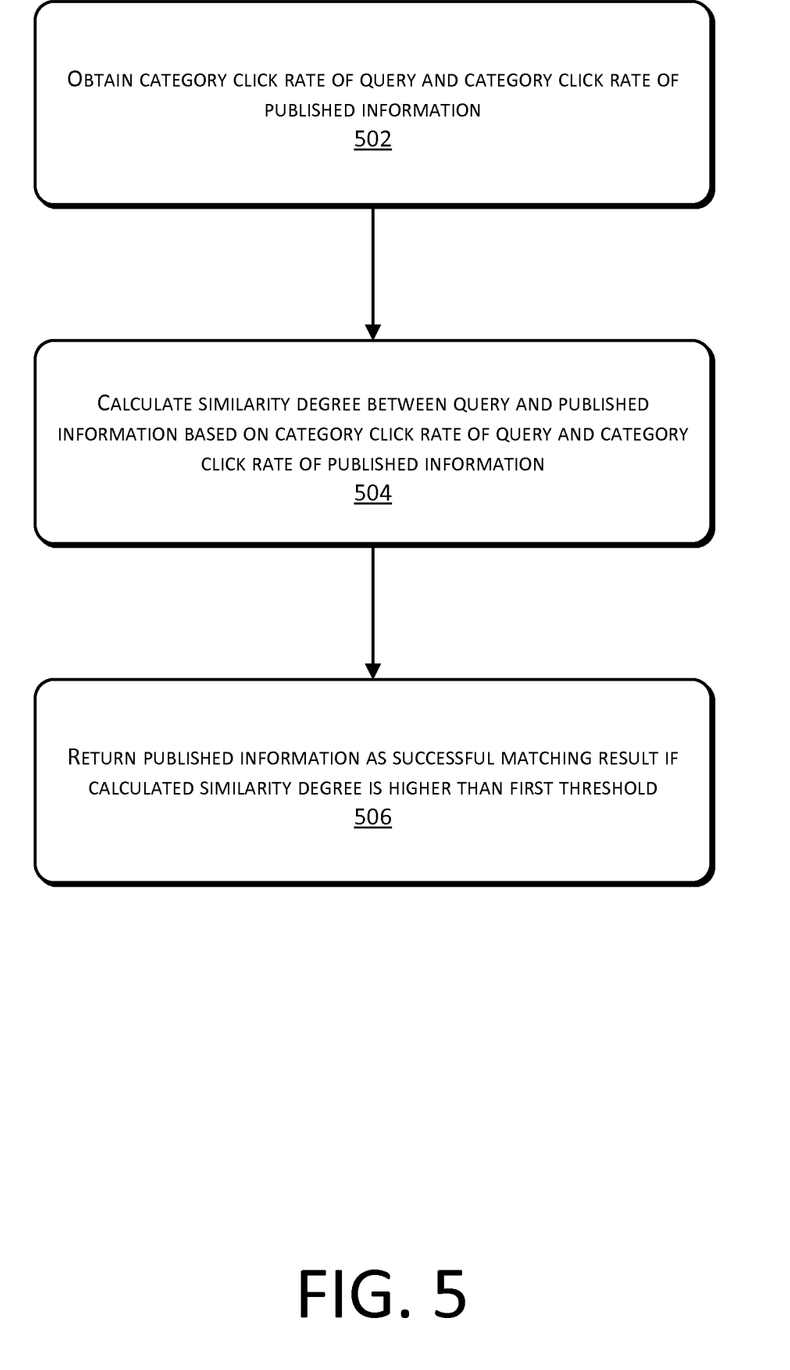
FIG. 5 illustrates a flowchart of an example method of searching information.

The present disclosure also provides a second example embodiment. Based on the information searching system and apparatus as shown in FIGS. 1-4, the present disclosure provides a method of searching information. FIG. 5 shows a flowchart of an example method of information searching.

At 502, a category click rate of the query and a category click rate of the published information are obtained. At 504, a similarity degree between the query and the published information based on the category click rate of the query and the category click rate of the published information is calculated. At 506, the published information is returned as the successful matching result if the calculated similarity degree is higher than a first threshold. The first threshold may be a preset number or set based on actual needs.

In this example embodiment, the category click rate of the query and the category click rate of the published information are used to calculate the similarity degree between the two, thereby ensuring a successful matching while considering the characteristics of both the query and the published information (or documents) to ensure the accuracy rate of the return result. In addition, this example embodiment returns the matching results based on the similarity degree instead of returning the published information only when the published information completely includes the query, thereby ensuring the accuracy rate of the return results while improving the returning rate, i.e., providing more return results to the users.

To reduce the processing time of returning the search results, the present techniques may improve the operations that obtain the category click rate of the query. For example, the query may be pre-processed before the category click rate of the query is obtained. The operations to obtain the category click rate of the query may include the following steps. The query is segmented to obtain one or more words. The category click rate of the words after the segment is obtained based on historical statistics information of category click rates. The category click rate of the words after the segment is a category click rate of a string formed by the words after the segment for a corresponding category. The following operations are performed to the words after the segment in turn. A word that is undergoing the following operations is called a present word. If a difference between a category click rate of a string formed by the words after the segment except for the present word and a category click rate of another string formed by the words after the segment reaches a second threshold, the present word is determined as a core word. Otherwise, the present word is determined as a non-core word. A category click rate of a string formed by all core words for the corresponding category is used as the category click rate of the query. In the above example, the query is pre-processed prior to calculation of the similarity degree. That is, unnecessary core words are removed from the query, and only necessary core words are used for calculation of the similarity degree. Thus, the calculation of the unnecessary core words is avoided and the speed of increasing return results is improved. For example, the above corresponding categories may refer to all categories in the historical statistics information.

For example, the pre-processing of the query may include the following operations. First, the query is segmented to obtain multiple to-be-processed words. Optionally, some stop words may be filtered out and the remaining words are used as the to-be-processed words, which may be conducted through a word table. In one example, the stop words may include descriptive words. The category click rate of the short string composed of all to-be-processed words in the query (for example, the to-be-processed words may include word A, word B, and word C) for the corresponding category may be Q. After word A is removed, the category click rate of the short string composed of the remaining words (for example, word B and word C) in the query for the corresponding category may be QA. Q and QA are compared. If the difference between the two is large (such that it is larger than a preset second threshold which may be set based on actual needs), it means that word A provides large volume of information to the original string Q and A is thus determined as the core word. Otherwise, word A is determined as the non-core word and is removed. Each word in the query is determined as core word or non-core word and the non-core words are removed. Finally, the category click rate of a string composed of all core words for the corresponding category is obtained, and used as the category click rate of the query.

To reduce the processing time of returning the search results, the present techniques may also make improvements to the operations that obtain the category click rate of the published information. The published information is pre-processed before the category click rate of the published information is obtained. For example, the published information may be segmented to obtain one or more core words. The category click rate of the string formed by all core words after the segment for the corresponding category is obtained from historical statistics information of category click rates. In this example, the published information is pre-processed prior to the calculation of the similarity degree, i.e., necessary core words are extracted from the published information. Thus, only necessary core words are used for calculation of similarity degree. The calculation of the unnecessary core words is avoided and the speed of increasing return results is improved.

For example, the operations to calculate a similarity degree between the category click rate of the query and the category click rate of the published information based on the category click rate of the query and the category click rate of the published information may include the following steps. A distance between the category click distribution of the query and the category click distribution of the published information is calculated based on the category click rate of the query and the category click rate of the published information. A similarity degree between the query and the published information is calculated based on an interval where the distance locates. In this example, the present techniques calculate the similarity degree based on the category click rate of the query and the category click rate of the published information, and consider characteristics of the both the query and the published information (or documents), thereby ensuring the accuracy rate of the return results. In addition, the present techniques determine the return results based on the similarity degree instead of returning the published information only when the published information completely includes the query, thereby improving the returning rate when ensuring the accuracy rate of the search results, i.e., providing more return results to the user.

In one example, the present techniques may use the KL distance calculation formula to calculate the distance between the category click distribution of the query and the category click distribution of the published information. In some other examples, the present techniques may use some other methods based on the system requirements. For instance, the following formula may be used to calculate the distance between the category click distribution of the query and the category click distribution of the published information based on the category click rate of the query and the category click rate of the published information.

$$D(Q_p, D_p) = \sum_w p_Q(w) \cdot \log \frac{p_Q(w)}{p_D(w)}$$

$Q_p$ represents the category click distribution of the query. $D_p$ represents the category click distribution of the published information. $D(Q_p,D_p)$ represents distance between the category click distribution of the query and the category click distribution of the published information. $p_Q(w)$ represents a category click rate of a string composed of core words in the query at a w th category. $p_D(w)$ represents a category click rate of a string composed of core words in the published information at the w th category. w represents a serial number of a category in the categories, w=1, 2, . . . M, where M is a number of all categories in the historical statistics information of the category click rate.

In one example, the operation to return the published information as the successful matching results may include the following steps. The returned multiple successful matching results may be ranked based on their similarity degrees from high to low. Thus, the user may quickly locate his/her desired matching results.

Figure 6:
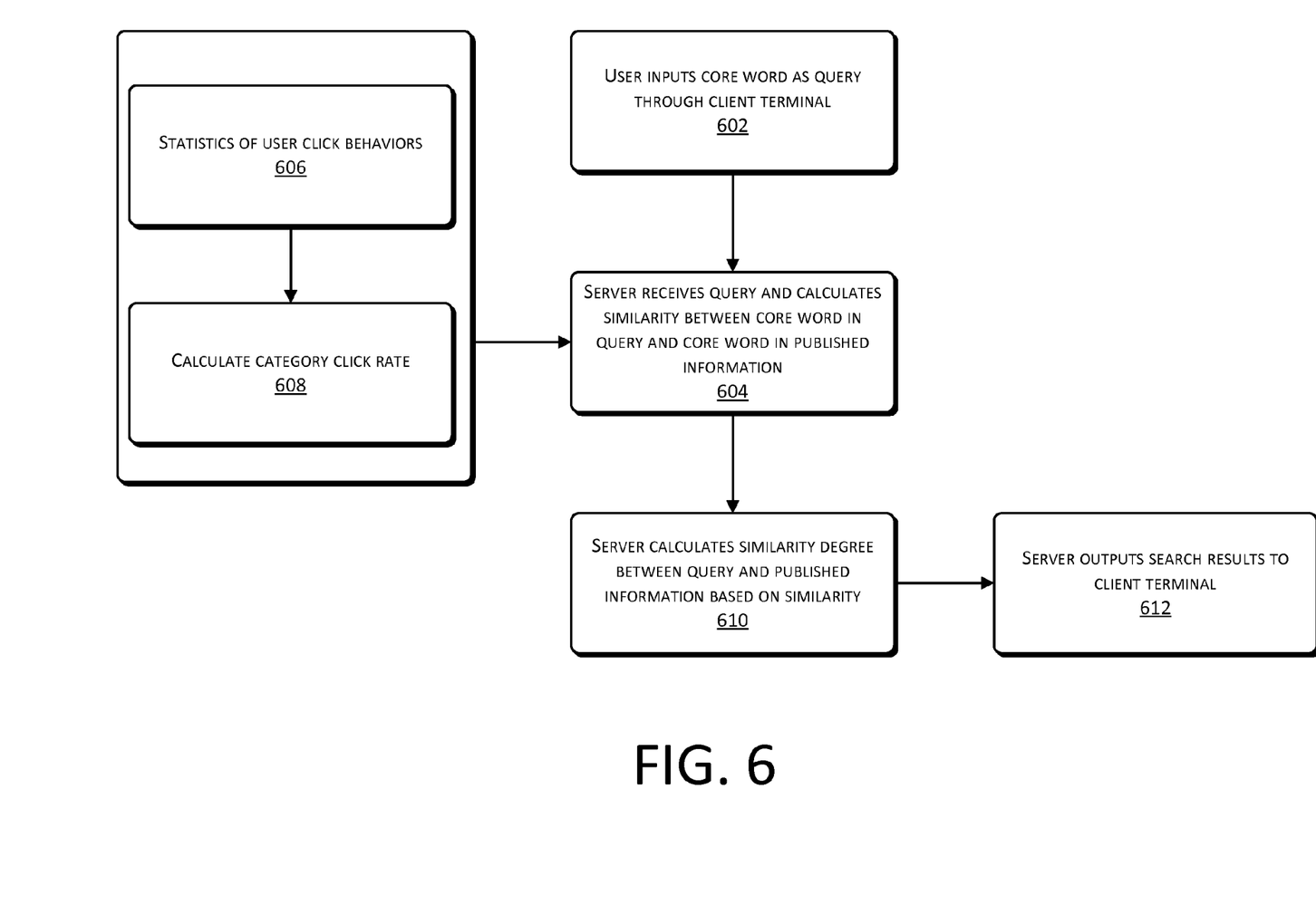
FIG. 6 illustrates a flowchart of another example method of searching information.

The present disclosure also provides a third example embodiment. FIG. 6 shows a flowchart of another example method of searching information.

At 602, a user inputs one or more core words as the query through a client terminal. At 604, a server receives the query and calculates a similarity between the core words in the query and the core words in the published information.

For example, at 606, the server may obtain statistics of the user click behaviors. At 608, the server may obtain the category click rate of the query and the category click rate of the published information based on the statistics of the user click behaviors at 606. For instance, the server may find category information of the published information (or documents) clicked by one or more users under each query through a search log, calculate a ratio of categories that the one or more users click under each query, and use the ratio as the category click rate of the query for the corresponding category. As the categories with few clicks may cause noise to the calculation and affect the accuracy rate of the similarity degree calculation, in one example, the present techniques may remove the categories whose number of clicks are smaller than a preset threshold. As the queries with few searching times may also bring noise to the calculation, the present techniques may also remove the queries whose searching times are less than a preset threshold. When calculating the similarity degree, the present techniques introduce the characteristics of the category click rate of the query.

In one example, before calculating the similarity degree between the published information and the query, the present techniques may pre-process the query and the published information. For instance, some words with little importance in the query may be removed. For example, the query is segmented to obtain one or more words. The category click rate of the words after the segment is obtained based on historical statistics information of category click rates. The category click rate of the words after the segment is a category click rate of a string formed by the words after the segment for a corresponding category. The following operations are performed to the words after the segment in turn. A word that is undergoing the following operations is called a present word. If a difference between a category click rate of a string formed by the words after the segment except for the present word and a category link rate of another string formed by the words after the segment reaches a second threshold, the present word is determined as a core word. Otherwise, the present word is determined as a non-core word. After all core words are determined, in one example, the category click rate of the string formed by all words for the corresponding category is the category click rate of the query.

In one example, the present techniques may pre-process the published information by extracting the core words from the published information. After the pre-processing, the present techniques may use the KL distance calculation formula to calculate the distance between the category click distribution of the query and the category click distribution of the published information. In some other examples, the present techniques may use some other methods based on the system requirements. The KL distance calculation formula is as follows.

$$D(Q_p, D_p) = \sum_w p_Q(w) \cdot \log \frac{p_Q(w)}{p_D(w)}$$

$Q_p$ represents the category click distribution of the query. $D_p$ represents the category click distribution of the published information. $D(Q_p, D_p)$ represents distance between the category click distribution of the query and the category click distribution of the published information. $p_Q(w)$ represents a category click rate of a string composed of core words in the query at a w th category. $p_D(w)$ represents a category click rate of a string composed of core words in the published information at the w th category. w represents a serial number of a category in the categories, w=1, 2, . . . M, where M is a number of all categories in the historical statistics information of the category click rate.

At 610, the server calculates a similarity degree between the query and the published information based on the similarity. The present techniques may determine an interval where the distance of between the category click distribution of the query and the category click distribution of the published information locates, and determine the similarity degree between the query and published information based on the interval of the distance. For example, the present techniques may classify the similarity degree between the query and the published information into three classifications based on the interval of the distance, such as classification 1, classification 2, and classification 3. The classification 3 is an optimal similarity classification, the classification 2 is a less optimal similarity classification, and the classification 1 is a least optimal similarity classification.

In addition, when classifying the similarity degree, the present techniques may also consider the following factors: whether the core words in the query are accessories of the core words in the published information, whether the core words in the query are successfully matched, etc. The accessories refer to the products represented by the core words in the query are ancillary products of the products represented by the core words in the published information. For example, with respect to "computer," "mouse, "keyboard," "case," and "power" are all ancillary products of the "computer."

For example, if the core words in the query are accessories of the core words in the published information, the classification of the published information may be set as the classification 3, i.e., the optimal similarity classification. If the core words in the query are not successfully matched, the classification of the published information may be set as the classification 1, i.e., the least optimal similarity classification. In addition, if the descriptive word in the query is not matched while the core word is matched, the classification of the published information may be set as the classification 2, i.e., the less optimal similarity classification. If a geographical regional word in the query is not matched, the classification of the published information may be set as the classification 1, i.e., the least optimal similarity classification.

Certainly, the above classification is just an example. The present techniques may make classification based on actual ne3eds.

At 612, the server outputs search results to the client terminal. For example, the server may return the successful matching results to the client terminal based on similarity degrees from high to low. Thus, the user may quickly find his/her desired results.

Different users may use different queries to express the same requirements. The present techniques, in the example embodiments, calculate the similarity degrees between the query and the published information, and classify the similarity degrees of the published information, thereby ensuring the accuracy rate and providing more search results to the users.

A person of ordinary skill in the art would appreciate that the modules, operations, or steps in the present disclosure may be implemented through one or more computing devices. They may be performed by one single computing device or distributed among a network composed of multiple computing devices. Optionally, they may be in the form of computer-executable instructions performed by the one or more computing devices or processors and stored at one or more computer storage media. The sequence of the operations or steps as described in the present disclosure are just for illustration purpose and different sequences or parallel sequences may be performed in some other examples. The modules, operations, or steps may be embodied in various integrated circuits respectively. Alternatively, multiple modules, operations, or steps may be embodied into one integrated circuit. The present disclosure is not limited to a combination of any specific hardware and/or software.

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a device of implementing one or more flows of the flow chart and/or one or more blocks of the block diagram can be generated through the instructions operated by a computer or other programmable data processors.

These computer program instructions can also be stored in other computer-readable storage which can instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions can also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The embodiments are merely for illustrating the present disclosure and are not intended to limit the scope of the present disclosure. It should be understood for persons in the technical field that certain modifications and improvements can be made and should be considered under the protection of the present disclosure without departing from the principles of the present disclosure.

What is claimed is:

1. A method performed by one or more processors configured with computer-executable instructions, the method comprising:
obtaining a category click rate of a query, the category click rate being a percentage of a number of clicks of a respective category to a number of all categories to which the query belongs, the obtaining a category click rate including
segmenting the query to obtain one or more words,
finding one or more core words among the one or more words from the query, and
obtaining a category click rate of a string formed by the one or more core words as the category click rate of the query;
obtaining a category click rate of published information;
calculating a similarity degree between the query and the published information based on the category click rate of the query and the category click rate of the published information; and
returning the published information as a successful matching result if the calculated similarity degree is higher than a first threshold.

2. The method as recited in claim 1, wherein the finding the one or more core words among the one or more words from the query comprises:
determining a word in the one or more words after the segment as a present word; and
if a difference between a category click rate of a string formed by the one or more words after the segment except for the present word and a category click rate of another string formed by the one or more words after the segment reaches a second threshold, determining the present word as a core word, or
if a difference between a category click rate of a string formed by the one or more words after the segment except for the present word and a category click rate of another string formed by the one or more words after the segment does not reach the second threshold, determining the present word as a non-core word.

3. The method as recited in claim 1, wherein the obtaining the category click rate of the published information comprises:
segmenting the published information to obtain one or more words; and
obtaining a category click rate of a string formed by the one or more words after the segment of the published information from historical statistics information of category click rates.

4. The method as recited in claim 1, wherein the calculating the similarity degree between the query and the published information based on the category click rate of the query and the category click rate of the published information comprises:
calculating a distance between a category click distribution of the query and a category click distribution of the published information based on the category click rate of the query and the category click rate of the published information; and
calculating the similarity degree between the query and the published information based on an interval where the distance locates.

5. The method as recited in claim 4, wherein the calculating the distance between the category click distribution of the query and the category click distribution of the published information based on the category click rate of the query and the category click rate of the published information comprises using a following formula to calculate the distance:

$$D(Q_p, D_p) = \sum_w p_Q(w) \cdot \log \frac{p_Q(w)}{p_D(w)}$$

wherein:
$Q_p$ represents the category click distribution of the query;
$D_p$ represents the category click distribution of the published information;
$D(Q_p, p_p)$ represents the distance between the category click distribution of the query and the category click distribution of the published information;
$p_Q(w)$ represents a category click rate of a string formed by core words in the query at a w th category;
$p_D(w)$ represents a category click rate of a string formed by core words in the published information at the w th category; and
w represents a serial number of a corresponding category in a plurality of categories, w=1,2,LM, where M is a number of all categories in the historical statistics information of the category click rates.

6. The method as recited in claim 1, wherein the returning the published information as the successful matching result comprises ranking multiple successful matching results based on a descending order of their similarity degrees.

7. The method as recited in claim 1, wherein the published information comprises product information.

8. The method as recited in claim 1, wherein the published information comprises news information and/or social network information.

9. An apparatus comprises:
one or more processors; and
computer storage media having stored thereon computer-executable components that are executable by the one or more processors, the one or more computer-executable components comprising:
an obtaining unit that obtains a category click rate of a query and a category click rate of published information;
a calculation unit that calculates a similarity degree between the category click rate of the query and the category click rate of the published information; and
a transmission unit that transmits the published information as a successful matching result if the calculated similarity degree is above a first threshold;
wherein the obtaining unit comprises:
a first segmenting module that segments the query to obtain one or more words;
a first obtaining module that obtains a category click rate of the one or more words after the segment from historical statistics information of category click rates, the category click rate of the one or more words after the segment being a category click rate of a string formed by the one or more words after the segment for a corresponding category;
a revising module that determines a word in the one or more words after the segment as a present word;
if a difference between a category click rate of a string formed by the one or more words after the segment except for the present word and a category click rate of another string formed by the one or more words after the segment reaches a second threshold, determining the present word as a core word; or
if a difference between a category click rate of a string formed by the one or more words after the segment except for the present word and a category click rate of another string formed by the one or more words after the segment does not reach the second threshold, determining the present word as a non-core word; and
a second obtaining module that obtains a category click rate of a string formed by the one or more core words for the corresponding category as the category click rate of the query.

10. The apparatus as recited in claim 9, wherein the obtaining unit comprises:
a second segmenting module that segments the published information to obtain one or more words; and
a third obtaining module that obtains a category click rate of a string formed by the one or more words after the segment of the published information from historical statistics information of category click rates.

11. The apparatus as recited in claim 9, wherein the calculating unit comprises:
a first calculation module that calculates a distance between a category click distribution of the query and a category click distribution of the published information based on the category click rate of the query and the category click rate of the published information; and
a second calculation module that calculates the similarity degree between the query and the published information based on an interval where the distance locates.

12. The apparatus as recited in claim 11, wherein the first calculation module calculates the distance between the category click distribution of the query and the category click distribution of the published information based on the category click rate of the query and the category click rate of the published information by using a following formula:

$$D(Q_p, D_p) = \sum_w p_Q(w) \cdot \log \frac{p_Q(w)}{p_D(w)}$$

wherein:
$Q_p$ represents the category click distribution of the query;
$D_p$ represents the category click distribution of the published information;
$D(Q_p, D_p)$ represents the distance between the category click distribution of the query and the category click distribution of the published information;
$p_Q(w)$ represents a category click rate of a string formed by core words in the query at a w th category;
$p_D(w)$ represents a category click rate of a string formed by core words in the published information at the w th category; and
w represents a serial number of a corresponding category in a plurality of categories, w=1,2,LM, where M is a number of all categories in the historical statistics information of the category click rates.

13. The apparatus as recited in claim 9, wherein the transmission unit further ranks multiple successful matching results based on a descending order of their similarity degrees.

14. The apparatus as recited in claim 9, wherein the published information comprises product information.

15. The apparatus as recited in claim 9, wherein the published information comprises news information and/or social network information.

16. A computing device comprising:
one or more processors; and
computer storage media having stored thereon computer-executable components that are executable by the one or more processors to perform actions including:
obtaining a category click rate of a query and a category click rate of published information, the category click rate being a percentage of a number of clicks of a respective category to a number of all categories to which the query belongs,
calculating a similarity degree between the query and the published information based on the category click rate of the query and the category click rate of the published information, and
returning the published information as a successful matching result if the calculated similarity degree is higher than a first threshold,
wherein the obtaining the category click rate of the query includes:
segmenting the query to obtain one or more words,
finding one or more core words among the one or more words from the query, and
obtaining a category click rate of a string formed by the one or more core words for the corresponding category as the category click rate of the query.

17. The computing device as recited in claim 16, wherein the finding the one or more core words among the one or more words from the query comprises:
determining a word in the one or more words after the segment as a present word; and if a difference between a category click rate of a string formed by the one or more words after the segment except for the present word and a category click rate of another string formed by the one or more words after the segment reaches a second threshold, determining the word as a core word; or if a difference between a category click rate of a string formed by the one or more words after the segment except for the present word and a category click rate of another string formed by the one or more words after the segment does not reach the second threshold, determining the word as a non-core word.

\* \* \* \* \*